(12) United States Patent
Bellamkonda et al.

(10) Patent No.: US 12,549,966 B1
(45) Date of Patent: Feb. 10, 2026

(54) COGNITIVE COMMUNICATION NETWORK MANAGEMENT

(71) Applicant: Amazon Technologies, Inc., Reno, NV (US)

(72) Inventors: Krishna Kishore Bellamkonda, Flower Mound, TX (US); Shonil Sudhir Kulkarni, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 307 days.

(21) Appl. No.: 18/194,047

(22) Filed: Mar. 31, 2023

Related U.S. Application Data

(60) Provisional application No. 63/477,523, filed on Dec. 28, 2022.

(51) Int. Cl.
*H04W 24/00* (2009.01)
*H04L 41/16* (2022.01)
*H04W 24/02* (2009.01)

(52) U.S. Cl.
CPC ............. *H04W 24/02* (2013.01); *H04L 41/16* (2013.01)

(58) Field of Classification Search
CPC ................................ H04W 24/02; H04L 41/16
See application file for complete search history.

(56) References Cited

U.S. PATENT DOCUMENTS

2022/0150132 A1* 5/2022 Fiumara ................. G06N 20/00

FOREIGN PATENT DOCUMENTS

AU 2022259730 A1 * 12/2022 ........... G06F 18/285

* cited by examiner

*Primary Examiner* — Erika A Washington
(74) *Attorney, Agent, or Firm* — Hogan Lovells US LLP

(57) ABSTRACT

Approaches presented herein relate to the analysis and/or management of a communication network including resources from multiple, independent communications networks. At least one edge device can be placed within individual communication networks, allowing for the capture and anonymization of data from the various provider networks. The data for various users can be aggregated by location and associated with an identifying key. A cloud-based service can generate a snapshot using this data from the various individual networks, and a decision engine can be used to generate a set of recommendations or actions to improve operation (e.g., performance or security, etc.) of the network or perform actions such as disaster recovery. The recommendations or actions can be provided for individual devices, locations, communication networks, or providers but based upon the data aggregated and analyzed across multiple individual networks.

20 Claims, 7 Drawing Sheets

COGNITIVE COMMUNICATION NETWORK MANAGEMENT

CROSS-REFERENCE TO RELATED APPLICATIONS

This application claims priority to U.S. Provisional Patent Application Ser. No. 63/477,523, filed Dec. 28, 2022, and entitled "Cognitive Communication Network Management," which is hereby incorporated herein in its entirety and for all purposes.

BACKGROUND

For communication networks, such as those that relate to telecommunications, it can be desirable to make those networks highly resilient, such as to be able to adapt to equipment failures, weather-related issues, or natural disasters or congestion resulting from traffic or other mass events. With network slicing, there might be a need for mission-critical network slices to have guaranteed resiliency per a Service Level Agreement (SLA), for example, irrespective of the underlying connectivity technologies. Existing approaches to providing a resilient telecommunication networks are generally terrestrial in nature, relying on cell site densification for redundancy purposes. There may also be temporary resources, as may relate to a Cell on Wheels (CoW) implementation, made available to augment the network coverage in case of failures. In many scenarios, such network augmentations and builds are susceptible to failures over an extended period of outages from disasters (natural or otherwise), for example, due to their reliance on limited power sources, such as batteries and generators. In addition, the devices that connect to the network in times of such disasters are susceptible to higher power consumption due to network unavailability during these times, and there is a need for the devices to be provisioned additional network search criterion to search for other carrier networks or alternate sources of connectivity, such as satellite connectivity. Existing generic network search procedures have a high impact on energy consumption for power constrained devices, and are thus undesirable in many such situations.

BRIEF DESCRIPTION OF THE DRAWINGS

Various embodiments in accordance with the present disclosure will be described with reference to the drawings, in which.

DETAILED DESCRIPTION

Figure 1:
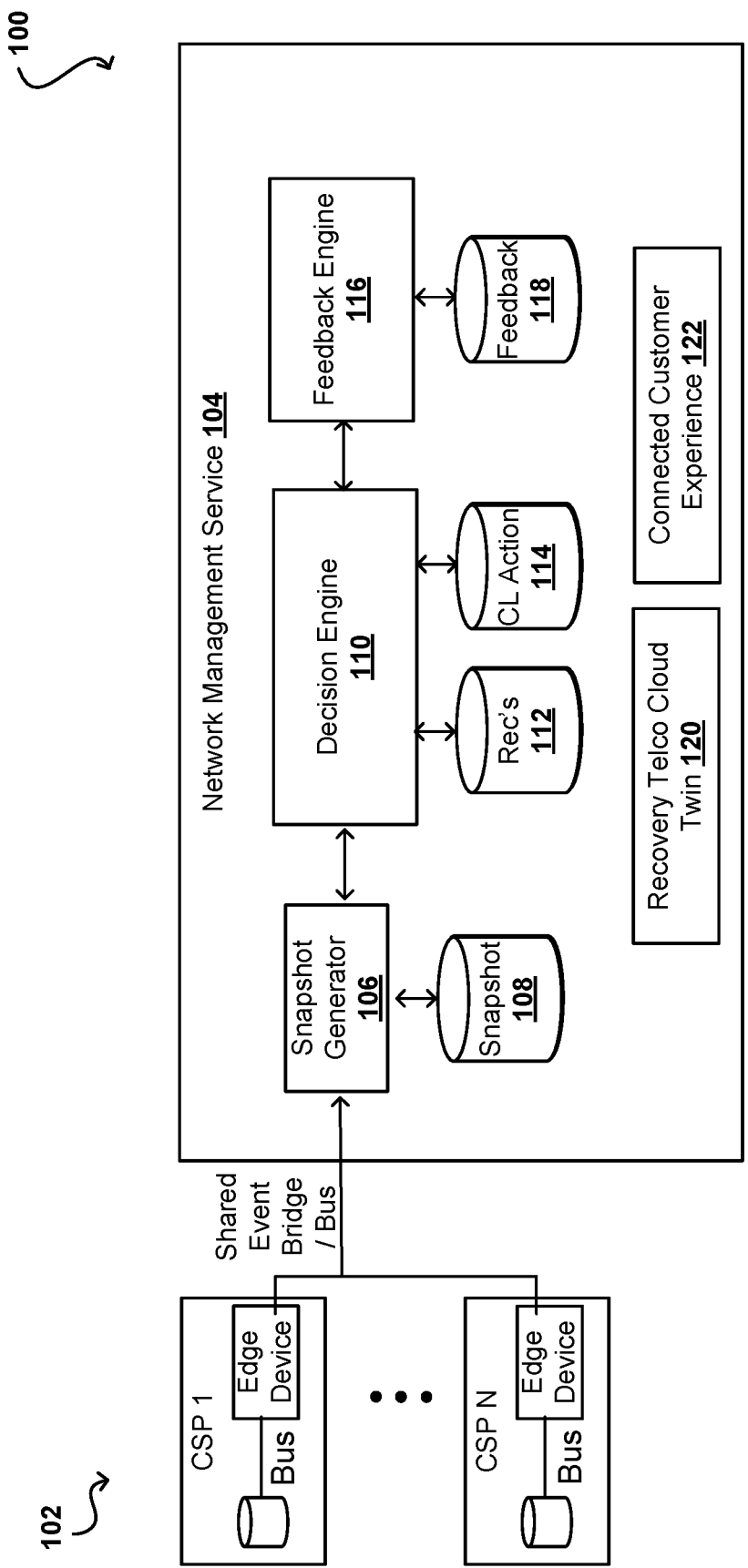
FIG. 1 illustrates a network management service that can be used in accordance with various embodiments.

Approaches described and suggested herein relate to the management of data and devices in a communication network that may contain, utilize, or connect with various network resources from multiple providers. In particular, various embodiments can provide for proactive and/or high resiliency wireless networks with heterogeneous coverage augmentation. Such approaches can provide for backup and restoration services that that can be automatically activated when there is an issue detected, or potential issue predicted, among other such triggers or determinations. In the case of network slicing and service level agreements managed by a neutral entity, such as a slice aggregator or mobile virtual network operator (MVNO) for slices or mission critical connectivity provider such as FirstNet, such approaches can also be leveraged to provide high levels of resiliency and always-available connectivity. In at least one embodiment, a cognitive network solutions framework can be provided, as may be part of an executive visioning process. A framework architecture can be used that can support cloud-based redundancy procedures for networks, such as brownfield and greenfield networks. An example recovery mode framework can use real-time telemetry from one or more operator networks in the cloud. This can be performed using, for example, an intelligent edge device, with telemetry data able to be enhanced with metadata as may relate to topics such as weather, congestion maps, and traffic maps. A user plane recovery set can be activated that includes augmented network functionality such as satellite connectivity, drone based coverage, and balloon based deployments (or any extra-terrestrial technology). An intelligent edge device can also provide data at different levels of granularity or volumes, such as when an event is predicted or occurring and it may be beneficial to have more current data upon which to make decisions. These decisions may also be made elsewhere, such as by a management service in the cloud, which can then be communicated to the edge device so the edge device can attempt to obtain and provide appropriate levels or volumes of data flow, at potentially different levels of detail, etc.

In at least some embodiments, an intelligent load balancer profile can be used to route slice traffic for various user, application, or network slices to a recovery set based, at least in part, on the relevant geography. Such slices can be assigned to end consumers and users who can benefit from such a highly resilient network. A fully cloud-native solution can then be offered to various communication networks (as may be public or private networks operated by entities such as private enterprises, individuals, or telecommunication service providers) as a service. In at least some embodiments, such an offering can utilize augmented connectivity that can be sourced and activated on demand. An offering in accordance with at least one embodiment can utilize an edge device on-premises at a communication service provider (CSP) location or at the edge of a CSP network, can enable interactivity of cellular technology (e.g., 5G cores) with web services, and can also provide interconnectivity to augmented network offerings.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an example network implementation 100 that can use aspects of various embodiments presented herein. In this example, a network management service 104 (or system or device, etc.) can receive data from multiple communication service providers (CSPs) 102. These providers may be independent providers (e.g., Verizon, AT&T, or T-Mobile) where data is not to be shared with different providers, or even exposed outside a provider network. At least some of these communication service providers (CSPs) will have redundancies within their infrastructure. For example, a CSP network may have a least two regions, or network cores, such that if disaster recovery is needed the CSP can automatically reroute traffic to a region or core that is not impacted by the disaster. In order to provide for enhanced recovery, at least some amount of disaster recovery can utilize a cloud-based network, or a non-cellular network where data can be routed using various computing resources connected by a network fabric. In at least one embodiment, a CSP could detect an issue and have at least some of the network traffic re-routed to a cloud-based network. A potential downside to such an approach is that it is typically very monolithic in terms of the scope of the service provider itself. Approaches in accordance with various embodiments can combine information from multiple CSPs, or other such providers or sources, into a central repository or other such storage location. This combined data can then be analyzed to provide more accurate results, such as may be provided through an intelligent network management service 104. Such an approach can effectively crowdsource data from multiple, independent data sources in both near-real time and non-real time to handle reactive and proactive scenarios. The proactive scenarios might benefit from a digital twin that could be used to simulate recovery or congestion events. For many of these CSPs, it would also take significant time and effort to introduce any new intelligence or functionality into their individual networks, which can be very complicated and involve many components spread out over a large geographic area. Further, the data centers for such networks generally will have limited resources, and any new intelligence will have to fight for capacity with higher-priority applications.

An approach in accordance with at least one embodiment can take advantage of at least one edge device sitting at, or near, a network edge for each CSP network 102 from which data is to be obtained. A given edge device can obtain information for a CSP network, such as by receiving data over at least one bus that is unique to that CSP network 102, as may correspond to an event bus, alarm bus, or other such bus for providing relevant data. There may be various data buses available in a given CSP network, and the edge device may be configured to listen to, or only receive data from, a subset of these buses. The information obtained or received can include various types of operational data, as may relate to (or include) performance data, fault data, configuration data, accounting data, or security data, among other such options. The edge device can then perform actions to synthesize, sanitize, and anonymize the data from the CSP network, except for location or other required information that is not specific to a user or entity. In at least one embodiment, data for groups of users or devices can be assigned respective keys, and only the location information and keys would be transferred from the respective edge device to the network management service 104. In at least one embodiment, the anonymized information collected by the edge devices for the various CPS networks can be transmitted over a shared event bridge or bus to be received to the network management service 104. The anonymized data from the various CSP networks can be aggregated in at least one embodiment, and stored into a centralized repository. The network management service 104 can analyze the data in the repository and make intelligent recommendations or take determined actions, effectively offering a cognitive network as a service. Anonymous network telemetry data can be collected from multiple CSPs, and passed over a centralized data link or bus to a centralized data store where the data is collected along with relevant metadata. This aggregated data can be analyzed to attempt to assess the current state of the overall network, including any or all of the individual CSP networks. The network management service in at least one embodiment can function as a digital twin of the combined or overall network, as the service will have access to current state data aggregated from the various individual networks or services, and can make recommendations or determine relevant actions based on this aggregated state data, as well as other information such as current or future contextual data as discussed in more detail elsewhere herein. The actions or recommendations thus may be for a current or future time, such as where actions are to be taken in advance of a future anticipated event or occurrence. In some embodiments, an edge device in a given network can determine, on its own or in combination with a local operation service, when to take any or all of those actions or implement those recommendations. Such data can be used to apply or enforce various security mechanisms as well within the scope of the various embodiments.

For recovery purposes, it can be important to focus on specific occurrences or events, such as may correspond to urgent matters or alarms that are generated. In at least one embodiment, each individual network can determine information such as the state of the network per location, the telemetry, the inventory management, and the relevant topology. When this information is received, it is possible to determine the state and configuration of each network. This information can be enhanced with metadata relating to aspects such as the relevant traffic or weather in a geographic region in which a network is located. These determinations can also be made in near real time. In at least some embodiments, a snapshot generator 106 can take this aggregated information from multiple CSPs 102, along with the relevant metadata, and can generate a snapshot of the combined networks, which can be fed as input to a decision engine 106. A decision engine 110 can analyze this information, and if appropriate can generate one or more recommendations 112, which may be applicable to one or more CSPs, or devices operating on those CSP networks, for example, or can attempt to take (or recommend taking of) one or more closed loop actions 114. In at least one embodiment, such a recommendation engine may be able to identify a significant percentage (e.g., at least 70%) of the actionable insights across these networks, as well as to identity a significant percentage (e.g., at least 85%) of the issues that may be encountered, by using at least one machine learning model. In at least one embodiment, a machine learning model can analyze the overall network over time and monitor the overall yield, such as a spectral yield. Based at least in part upon changes in the yield or performance, for example, various actions or recommendations can be taken, made, or provided. Such an approach can be both proactive and reactive, as the changes in yield can help to identify current issues or predict potential issues, and the traffic and weather information and other metadata can help to identify current issues and predict potential issues at specific locations and times, such as may be due to current traffic congestion or oncoming storms, and make changes to account for these issues. At least some of these actions may involve closing the loop or preparing certain users or devices (such as by proactively spawning specific configuration changes) in certain locations for accessing other networks, satellites for communication, cable networks, and so forth, as a type of recovery. In one example, if a hurricane is predicted to hit a specific location at a specific time, the network traffic can be proactively routed to a consolidated cloud network, such as may run using Amazon Web Services (AWS) or another such system, service, or offering. The traffic for one or more CSPs in or around the area at the time the hurricane is to hit can then be re-routed through the cloud based network, providing network access in real time, where there might otherwise be no access due to an unavailability of a CSP network in that general geographic region.

Such an approach can be used to proactively prepare various devices, such as smartphones or Internet of Things (IoT) devices that may use a CSP network, so that those devices can access a network of a different CSP, a cloud-based network, or a satellite network, among other such options. In at least some embodiments there may be a priority or hierarchy attached to these other options, as satellite communications may be available but may also be very power consuming for a device, so it may be preferred to connect to a different CSP network if available, particularly in a hurricane or other situation where charging the battery of a device may not be an option for at least a period of time. The devices could be provisioned with a prioritized list, based on factors such as network availability or recovery in real time in order to increase the probability of having basic connectivity of meeting the SLAs in case of mission critical network slices. In some embodiments, there may be certain criteria to be satisfied before a device is caused, or requested, to access a different network or communication option. Such a machine learning-based approach can surgically and dynamically identify a group of devices that need to be (or could benefit from being) augmented, and the configuration profiles can be automatically provisioned for those users, so that they are able to use a shared recovery cloud, for example, as opposed to an individual telecommunication network.

In at least one embodiment, the network operations centers (NOCs) for several different CSPs can effectively be consolidated into a single NOC for purposes such as disaster recovery (although such use is not limited to disaster recovery and can be applied to any technical purpose). This consolidation can be performed automatically in response to, for example, alarms being detected over the various alarm buses for the CSPs 102 that can be received to, or intercepted by, the various edge devices and forwarded over a shared event bus, for example, to a network management service 104. Relevant data can also be gathered using other CSP buses in the respective CSP environments, and this data once anonymized and transmitted by the respective edge device can be used to generate a snapshot 108 of the combined networks in, or near, the site of the disaster, or those areas impacted by the disaster. The data can be obtained by the edge devices from the respective CSP buses using any appropriate mechanism, such as through use of a connector or adaptor, which may be physical or virtual. The buses can be any appropriate buses, such as internal (local) data buses, external (expansion) buses, system buses, memory buses, address buses, or front-side buses. The buses can also be parallel or serial buses. An edge device can listed on various output data lines or address lines of a given bus, or can listen on wires of a bi-directional bus that can be used alternatively for input and output. In some embodiments, an edge device can take advantage of a publish/subscribe model to subscribe to specific types of event data, such as events or alarms, that can be published or posted on one or more buses. Other approaches for obtaining data from one or more buses, wires, bridges, or other such mechanisms can be used as well within the scope of the various embodiments.

A network management service 104 can thus function as a consolidated NOC for the combined network of the various providers. The network management service 104 can then have the ability to make changes in the combined network, or at least recommend changes to be made to the combined network that can be sent to the appropriate recipients or addresses for the various CSPs. Such an aggregation service can thus not only combine and make recommendations based on aggregated or consolidated data, but can also make recommendations or take actions based on the state of the consolidated network as a whole, acting as a NOC for the combined network.

As mentioned, a snapshot generator 106 can be used to aggregate data from the various CSP networks and combine the aggregated data with relevant metadata to generate representative snapshots 108. The data from a given CSP can be anonymized to remove any identifying or sensitive data other than, for example, approximate geographic location (thus also addressing potential privacy concerns). The snapshot data can then be stored to a single repository 108 for subsequent analysis. At least some amount of curation can be performed, which can include tagging the data per location. In at least some embodiments, data received from CSPs will have some amount of geographic binning ("geo-binning") performed, where users are grouped by their proximity. Users can then be analyzed based on their relative, generic location rather than their identities or other such aspects. The sizes of the bins can vary, and can be dynamically or user configurable in at least some embodiments. For example, a default bin size might be a one hundred square kilometer area, as may correspond to a size that enables inferences or determinations to be made with sufficient accuracy or resolution. The size may be based upon factors such as a density of users, as there may be 10,000 users in a four square kilometer urban region but in a one hundred square kilometer region in a suburban or rural area. In at least one embodiment, the size should be set such that a sufficient amount of data is obtained for a set of geographically-proximate users. This binned group of users can then be provided with a distinct identifier, such as a unique key. The unique key can be used to identify the group or population of users (as well as other data such as network KPIs, etc.) in order to correlate data, actions, and recommendations with a location or region associated with the group of users. The key can also be an anonymized key associated with data for users in a geographic region. No other data will be exposed for those users, other than potentially the CSP those users were using, or other information that is not unique to, or indicative of, a particular user or user device. Various amounts of data marshalling or other preparation can be performed to generate this anonymized data set associated with a group key. At the same time, the network management system 104 can attempt to flatten the data from the combined data sets, including location and user snapshots, as well as the relevant metadata (e.g., traffic and weather) for the respective geographic region, among other such options.

A snapshot 108 generated using such a process can be a contextual network snapshot that is based on location and time. This can include analyzing data for a determined region at a particular time, such as a time of a specific day, morphology such as dense urban or suburban or rural or highways, modality such as devices in motion or stationary within a relevant time window. And the snapshot can reflect the keying applied per location and contextual metadata, with data aggregated from multiple providers having data for, or relating to, a given region. These snapshots in at least one embodiment can be generated periodically, such as once per data, for use with tasks such as system or network analysis, auditing, or modeling. Snapshotting at a normal cadence of every 24 hours may make sense because there will be base maps and performance expectations, for example, and such snapshotting allows for detecting or predicting any changes or trends across the various providers. Snapshots can also be performed or generated in response to specific actions, events, or alerts, such as may be in response to a mass accident on a highway or network outage of a provider in a given region. Snapshots may also be generated more frequently for events such as predicted bad weather patterns over a period of time, in order to be able to more quickly detect or predict changes that need to be made during that period of bad weather to ensure network availability, etc. The snapshot generator 106 or snapshot model thus can be at least partially event based in at least some embodiments. There may also be locations and time windows when snapshots are pulled more often based on predicted or observed patterns, such as to generate snapshots more frequently in an urban area where highways are typically very congested during an evening commute, and there will often be a very large number of user devices attempting to connect to the network in that location during those windows. In such situations, it may make sense to take frequent snapshots, such as at every hour, 20 minutes, or even 5 minutes to be able to detect or predict issues that may arise in such vulnerable situations. Due at least in part to the large number of user devices and the limited network capacity for various providers in that region, it may be necessary or appropriate to split or rearrange the network traffic at different times, such as to switch some of the network traffic to a different provider network when a current provider network is at, or near, capacity.

Such an approach can also be beneficial for use with functionality such as network slicing. Regions of a network can be divided into various slices, and then re-aggregated as appropriate using a slice aggregator. This might be beneficial for devices such as connected vehicles, which may have a slice of network capacity allocated that may include network capacity from multiple operators. Components of a slice can change based on factors such as the current location and future location of a device. More frequent snapshotting can help to make changes as appropriate, given a more holistic network state and functionality view across multiple provider networks.

As illustrated in FIG. 1, a component such as a decision engine 110 can take one or more of these snapshots as input (such as to make decisions based on only the current state or by analyzing the state over a recent period of time) and generate output such as recommendations 112 and actions, such as closed loop (CL) actions 114. The recommendations and actions can be provided to the relevant CSPs, or in some instances at least some actions may be taken automatically for at least some types of actions where permitted by a CSP or other authorized agent. An action to be taken automatically can be executed or instructed by an edge device in a given CSP network, as many CSPs will not want at least certain changes, if any, to be performed from outside the respective network, such as from a cloud device. In such an implementation, an edge device can act as an agent of a cloud-based service, but also as a trusted device within a CSP (or other such) network or environment. The edge device can also work with existing automation framework and/or standards-based interfaces (e.g., open radio access network (ORAN) interfaces) to execute or instruct at least some of these actions. For example, actions can be determined to be taken for specific users or customers who have been having problems with their devices recently, and based on their location a determined recommendation can be applied that may be relevant based on the information known about those users or customers within a given network. Thus a recommendation might be provided to an edge device based on various factors, but the edge device (or other component inside a given network) may need to determine the various users or devices to which those recommendations may apply.

For closed loop actions 114, the CSPs for a combined network will likely want, or require, at least some level of control when performing tasks such as disaster recovery. The CSPs in many instances may therefore not want, or permit use of, a fully automated system that can make changes on their behalf. There may be at least some types of changes that are permissible, however. For example, a network management service 104 may have the ability to implement closed loop actions 114 to change the shape of a given network cell. Changes to a network cell can involve tasks such as changing a size, tilting, or changing a power of a region of a communication network in a contextual manner consistent with the morphology, modality, and time windows. Actions may be able to be made automatically by a network management service 104 where there is a need or benefit to rerouting traffic or changing behavior of the network. It might be the case, however that the deterministic model of the decision engine 110 does not provide sufficient information to take such actions, or does not have permission to take such actions, and may instead generate recommendations 112 which can be provided to the relevant CSPs or other agents in order to provide them with information useful in determining the appropriate actions to take in their specific networks. For example, the decision engine may make recommendations to improve the yield of a site, and an agent of the corresponding CSP(s) can analyze those recommendations and choose to implement, ignore, or modify. The network management system 104 can have telemetry data coming in continually and can determine when it would be beneficial to make changes, such as to make a tilt change for five degrees right on a site, which the operators can then choose to implement if desired to optimize factors such as yield or performance, although there may be other reasons or goals that may cause the operators not to implement such recommendations.

In at least some embodiments, a network management service 104 can monitor information for these actions or recommendations, such as to determine when actions or recommendations were implemented, ignored, or modified, and to determine the impact of any of those changes (or lack of changes). This information can be stored as feedback 118 for analysis by a feedback engine 116 or other such component. A feedback engine 116 can analyze this feedback to determine, for example, if certain recommendations or actions that were implemented have improved the coverage of the network, and if not then that feedback can be used to finetune a deterministic model of the decision engine 110 to generate more accurate inferences. In some embodiments, a feedback engine 116 may also provide feedback such as where a given change worsened network performance, in which case another change can be made or a previous change can be undone (or recommended to be undone). Various other feedback cycles can be used as well within the scope of the various embodiments. Feedback also can be determined over time, such as where a change may not have resulted in an instantaneous change in performance, but improvement was noticed over the next few days or weeks. A learning engine can thus benefit from the availability of additional data over time to make more accurate inferences. A risk/reward model can be used in some embodiments to leverage aspects of machine learning and artificial intelligence, such as where a reinforcement learning model can be used that can help to make contextual decisions, and improve the quality of those contextual decisions over time, based on factors such as current versus expected yield for a given change, as well as feedback for prior recommendations or actions, among other such factors. An example yield may relate to spectral utilization, and it may be inferred that a certain increase in spectral utilization will be observed for a given increase on capacity. A system or service can also attempt to improve aspects such as the coverage, performance, or amount of congestion in a network, but an improvement in one of these aspects may have a negative impact on at least one other aspect as a type of tradeoff, and these aspects can be balanced to attempt to obtain an optimal performance for a given state or set of circumstances. In at least one embodiment, a trade-off matrix can be consulted or considered when training or implementing recommendations of, for example, a multi-yield optimization model. At least some, if not all, of these determinations can be made using data that is aggregated from multiple providers using a type of crowd-sourced approach.

In another example, a network management service can attempt to make changes on multiple networks. Data can be aggregated from all relevant CSPs, such as to determine that for networks operating at the 3.4 gigahertz frequency band a first yield is obtained, wherein operators at the 700 megahertz frequency band are obtaining a different yield. An attempt can be made to reconcile these differences, such as by finetuning a contextual model. Further, if an operator is planning to deploy a new site at 3.4 GHz, the network management service can provide operation estimates, and an recommend changes to be made to improve the overall operation of the aggregated network given the presence of this new site. The network management service 104 can provide recommended power and other settings that may be useful for the new site in this particular location based on previous experience. The service can provide more insightful recommendations for users or providers even before the site is deployed in order to help obtain the best, or at least improved, initial operation. These recommendations can also take into account operation of similar other areas or configurations. A feedback engine can become more powerful and useful at scale across multiple providers and multiple regions where larger amounts of data for similar or differing states and locations can be analyzed and used to provide feedback.

Figure 2:
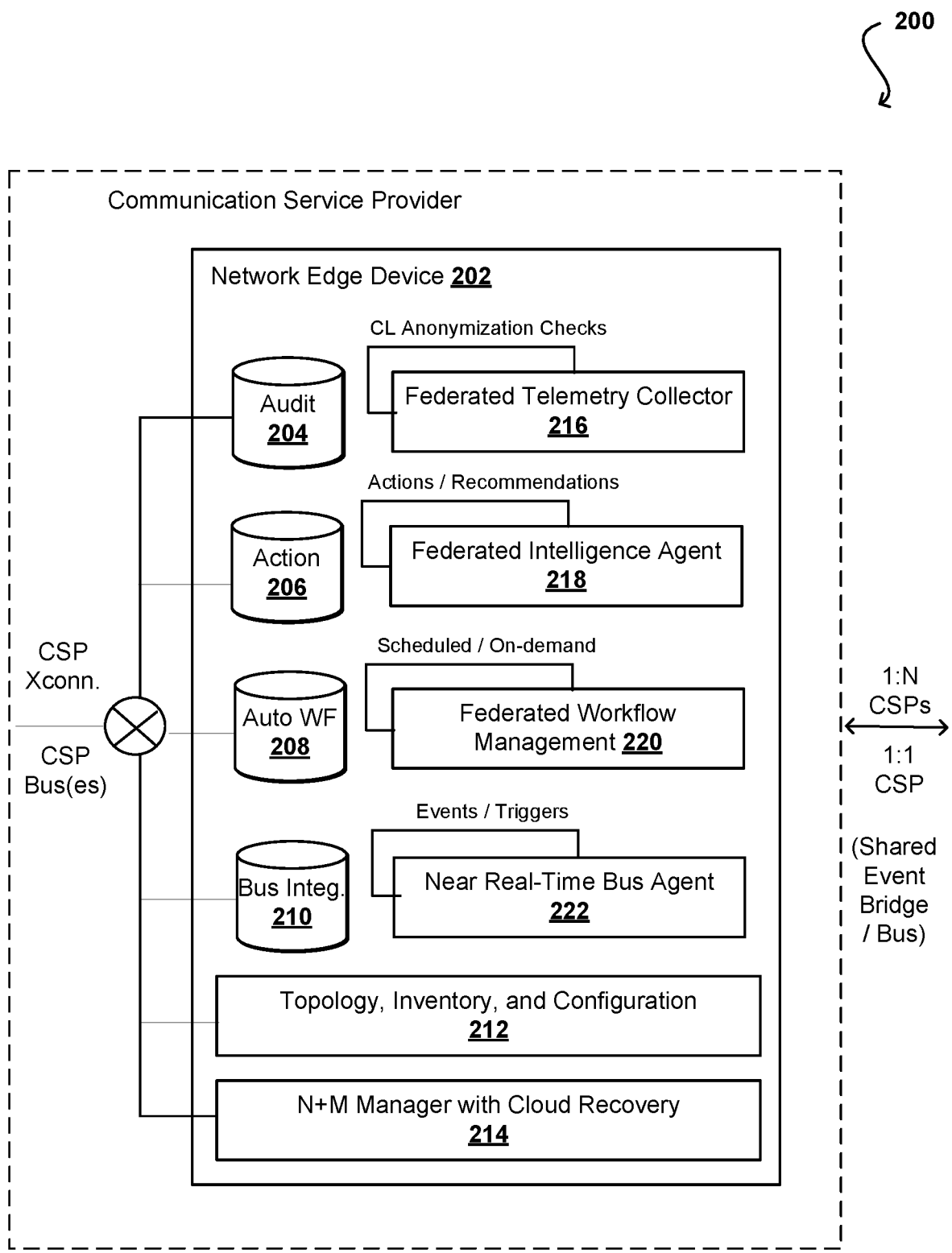
FIG. 2 illustrates an example network edge device that can be utilized in accordance with various embodiments.

As mentioned, at least some of the data can be obtained using network edge devices 202 located near the edge, but still within, various communication service provider networks 200 such as is illustrated in FIG. 2. There may be one or more edge devices allocated per CSP network. An edge device can sit on top of the existing bare metal infrastructure for a CSP network, while still remaining associated with a cloud-based Web service, for example. There may be one or more agents, such as a telemetry collector 216, in a such a device 202 that can attempt to collect all the telemetry from a CSP network, and be able to provide closed loop anonymization checks, such as may utilize a distributed ledger or blockchain at least for validation and/or auditing of the data. In at least one embodiment, every byte of data that goes in and out of a CSP network is monitored and logged, and written to a distributed ledger. Such an approach can be used to ensure that no sensitive or protected data leaves the CSP network during this process, acting as a type of self-audit. Such functionality can be implemented at the edge of the CSP network, and not in the cloud, to ensure all data filtering is applied before the data leaves the CSP network.

A federated intelligence agent 218 can be used for tasks such as federated learning for federated models. In various embodiments, the service will not be able to make at least some changes to a CSP network, or transform the CSP network. A network management service can instead interact with existing CSP systems and make recommendations that are intended to improve operation based, at least in part, upon aggregated data from other CSPs that might otherwise not be available to an individual CSP. These recommendations or actions can be provided directly to existing system or as part of a workflow, as may be managed by a federated workflow management component 220. In a radio access network (RAN), for example, it may not be sufficient to only make one change and then stop, but a workflow may be needed to ensure that incremental changes improve the operation without negatively impacting other aspects, or the operation of nearby cells, etc. These issues will generally be multi-dimensional in nature, such that changes may be implemented incrementally and/or one dimension at a time, where the results can be monitored and then used to determine a next step or incremental change to be made, etc., as part of a prescriptive analytics process based, at least in part, upon determined workflows. A federated intelligence agent 218 can thus make recommendations as part of a workflow, adapting the recommendations or generating new or further recommendations as part of the workflow. Such an approach may also be beneficial because a network management service may not have real time (or near real time) connectivity between the cloud and the edge, so a learning model can be implemented that looks at the time series data, makes some recommendations, and may provide a set or sequence of actions that can be deployed at the at the customer side. Real time in this instance may be on the order of a few milliseconds. A federated workflow thus may involve a multi-step optimization process that can be implemented in the CSP network 200.

A network edge device 202 can also include a near real-time bus agent 222. Such an agent can be used to connect to a real time bus of the CSP network. This can enable the agent 222 to perform tasks such as to listen for events or listen for alarms that may be issued within the CSP network. It can be beneficial to listen to, and aggregate data for, events across multiple CSP networks, particularly when analyzing quality of experience or performing tasks, such as network slicing. Such an agent can look at core networks or RAN networks, backhaul, etc., and can pull all relevant information that may be published on the bus as events. For example, an event for a cell unavailability may be generated in response to a heartbeat failure in the CSP network. A near real-time agent 222 can communicate this event data in near real time so that appropriate adjustments (or recommendations) can be made to minimize the impact across the various CSP networks. There may be data aggregated from buses within each CSP network that are then transmitted over at least one event bridge or bus to the network management service provider network. A bus agent on an edge device can essentially listen to all events published on the relevant event bus in a CSP network, and can push the relevant data (after any anonymization) to the network management service for analysis with events from other CSP networks. In at least one embodiment, the bus can be used with an arbitration system per CSP. A synthesis model can be used to collect relevant information and then publish this information onto a common bus. The CSP bus is not extended, as generally being impermissible within a CSP network implementation, but the agent 222 can subscribe to specific types of events published on the event bus, as may related to "cell down," "network down," or "backhaul failure" events. The agent can also subscribe to generic alarms. Any data received as a result of these subscriptions can be synthesized then posted on the bus on the cloud side to be received by the network management service. As mentioned, this can be performed for various locations and CSPs without extending the event bus, but instead acting as more of an arbitration.

Such an approach can be beneficial because there can be vast amounts of data transmitted across such as network, such as multiple terabytes over a relatively short period of time. A synthesis model can be used by collecting data from multiple sources and then organizing this data per location, such as for users or user devices within individual locations. The sizes of the locations can also be set to help prevent the associated amount of data from becoming overwhelming, as well as to comply with any security or network requirements. Pushing terabytes of data from all these operators to the to the cloud would not be optimal in at least many situations, such that intelligent division, aggregation, and filtering can be beneficial.

At least one topology, inventory, and/or configuration component can represent 212 the current state of the network. The configuration data can be important to determine, across the network, is a given cell out, down, or in a dormant state, etc. This type of information might only become available in the event of a heartbeat failure or cell failure that was detected. There are other states, such as intermediary states, where the topology metric configuration data can be beneficial as well, such as to predict a potential failure. This information may be collected at a regular interval, such as at a 24 hour cycle, but there might be circumstances where this might be increased or accelerated for specific locations based on observed or predicted events, etc. For predicted events the configuration and topology information may be pushed more frequently.

Another component in this example edge device 202 is an N+M Manager with Cloud Recovery component 214. Typically when operators run a network, the operators (except for certain networks such as RANs) may only have one telecommunications tower, or may have multiple towers, but here is no redundancy or presence of backup towers. An N+M component 214 can be useful for the cloud or packet core, for example. Such a component can analyze a number (e.g., 3) of active instances that each take different load patterns. In one example, the traffic load can be split in thirds across three different active instances, the N instances. There also can be a number (M) of standby instances, such as two or three standby instances. In such a situation, a small portion (e.g., 1%) of the traffic can be pushed back to the core as part of a trickle or warming process, which would prevent delays for changes in the network. This pushback to the network in the cloud could be done per device or per type, among other such options. There can then be connectivity in place as a part of the N instances to the hybrid cloud, or the cloud recovery service. This helps very basic weights to be in place, which can be decided by the device type or location, or whatever else the case may, so the system can react more quicky in the event of a problem. The system can adjust the weights based on how the traffic is pushed out, for example.

Figure 3:
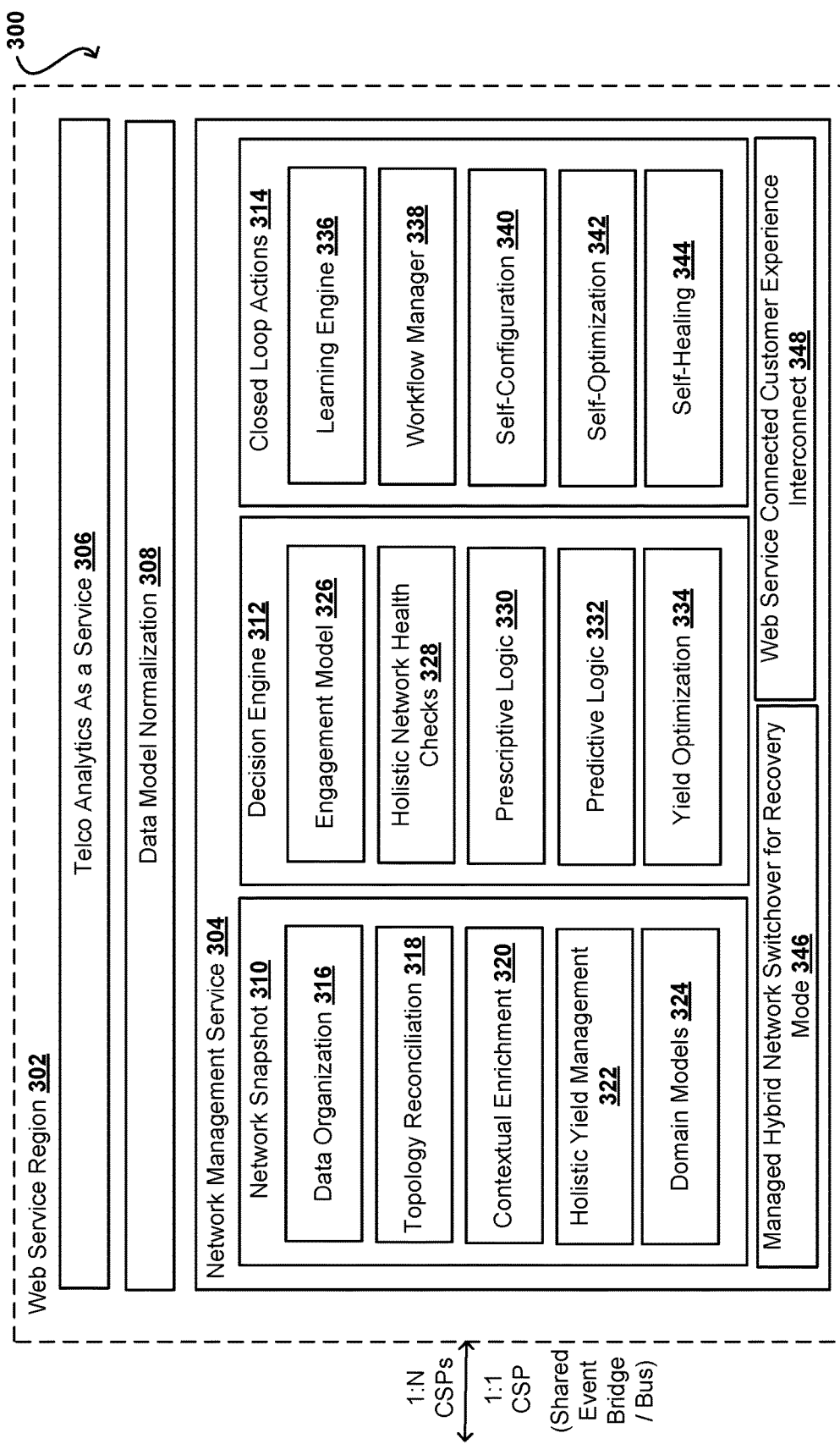
FIG. 3 illustrates an example telecommunication components of a web service region that can be utilized in accordance with various embodiments.

FIG. 3 illustrates a view 300 of components of an example network management service 304 in a Web service region that can receive such data from the various edge devices in accordance with at least one embodiment. The Web services region 302 may also include components such as telecommunications analytics as a service 306 and data model normalization 308, as well as managed hybrid network switchover for recovery mode 316 and Web service connected customer experience interconnect 348, among other such options.

Data can be received, over at least one common bus, from edge devices for the various CSP regions to a Web services region hosted using a variety of different cloud-based resources. As mentioned, a network snapshot generator 310 can generate snapshots on this received data, performing tasks such as data organization 316, topology reconciliation 318, contextual enrichment 320, holistic yield management 322, and potentially using domain-specific models 324. These snapshots can be fed as input to a decision engine 312 that can use an engagement model 326 to perform analysis, in combination with modules relating to holistic network health checks 328, prescriptive logic 330, predictive logic 332, and yield optimization. In addition to recommendations, the network management service 304 can use output of the decision engine 312 with a closed loop action generator 314, which can include a learning engine 336 and workflow manager 338, which can be used with modules for tasks such as self-configuration, self-optimization, and self-healing.

In at least one embodiment, a model can be used in the data organization component 316 that can organize data along various dimensions, such as location per frequency band. This dimensionality can help the service 304 to better determine aspects such as how a particular network band or device type works across the various networks. As mentioned, the data can be anonymized and known per location, so population-based analysis can be beneficial. These populations include one or more locations of users, where those locations are associated as individual entities with associated identifying keys. A hash can be created for these populations or locations to allow for data recovery, and the data can be aggregated across multiple CSPs (or other such operators or providers). The hash in some embodiments may be generated using specific type of data, such as identifiers for types of devices being used, where the data used to generate the hash is anonymized and permitted, and the information is unable to be extracted from someone intercepting only the hash value. The secrets used for the hash may come from a trusted cryptographic store in at least some embodiments. If a location includes five users with operator X and 10 users with operator Y, for analysis purposes this can correspond to a population of fifteen users, where each of the users can receive a portion of the recovery cloud as appropriate. In some embodiments, the users may correspond to individual operators or providers. An important aspect in at least some embodiments is that the relevant population is organized and keyed. A topology reconciliation component 318 can help to understand the type and morphology of a give location, such as whether it is suburban or rural, a type of user density, size of the location, etc. These values can be determined using factors such as a number of cell towers or users in a given network, etc. In at least some embodiments, this information can be used to identify a minimum viable minimum granularity at which changes can be made. A contextual enrichment module 320 can provide additional contextual information that can help with these decisions, as may relate to time of day, types or classes of devices (e.g., smartphones versus IoT devices), and the like. A holistic yield management component 322 can be used for holistic yield management. In a typical scenario, not involving disaster recovery, the most common denominator that defines a yield of an operator can related to the spectral yield. For analytical purposes, the spectrum yield can be thought of as the asset and the users of the network thought of as the utilization, where there is an attempt to maximize the spectral yield. Not just spectral yield by bits per Hertz, but also considering the output. There can be an overall yield to be determined. Then, the service can attempt to maximize the yield for the given circumstances, state, and context. A domain models component 324 can determine the operational units that are available in a given location at a particular time that may be available for recovery, such as may include low orbit satellite-based networks.

The decision engine 312 can take the aggregated data in the various snapshots and analyze them using, for example, a set of machine learning-based tools. These tools can be used to infer data that may related to aspects such as feature impact analysis, network statistics, operational predictions, and so on. If the overall network is functioning generally as expected, then the system may not cause the decision engine to pull one or more data snapshots and perform analysis, as there are no active changes that need to be made, although in some embodiments the decision engine may perform analysis periodically in an attempt to improve operation over time. This determination can be made with respect to the network as a whole, considering data from all respective providers from which data is available. When actions may be appropriate, such as when an event is detected or network performance is less than optimal, one or more machine learning models can be used, as may relate to decision tree models, to determine the decisions to be made, including step-wise decisions. This can involve the prescriptive logic 330 and predictive logic 332 components. This can then all be tied together at a yield optimization module 334 or phase.

The closed loop actions determination module 314 can include a learning engine 336 and a learning manager 338 as discussed previously. There can be three models operated in this example that relate to self-configuration, self-optimization, and self-healing. The aggregated data nature of the network management service enables this to be performed at a global level as opposed to at a network level. Proactive planning can also be used to provide known good configuration information to a new provider, for example, based on what has been observed to work in the past for similar provider implementations. Self-optimization can be performed at any time in some embodiments, such as to slightly modify cell shape to improve yield or reduce a site to optimize for energy versus coverage, and so on.

A self-healing module can attempt to address any problems in the network, and thus can at least partially trump (or have a higher priority than) self-configuration 340 and self-optimization 342 decisions. Different weights can be applied based on these priorities as may relate to action to be taken, and a self-healing phase can take advantage of a managed hybrid network switchover for recovery mode. Self-healing can be determined at least in part using data organized by device population and location, which can determine how to best implement a switchover. When a change or issue is detected during monitoring of the overall network, data relating to the device population and location can be sent and used to generate a network snapshot, where the location is aggregated with a unique key, such as a hash key. The decision engine 312 can attempt to determine where changes should be made to the network or devices, such as where traffic for various devices is to be routed to a satellite-based network, to a network of another CSP, or to another network such as a temporary cell on wheels, cell on drones, or cell on balloons, among other such options. There can be various recovery options, at least some of which may require pre-provisioning of the devices. It may not be necessary to pre-provision all the devices because in a disaster scenario, one of the biggest contributors for power consumption in a cell device is the network search phase. It can therefore be beneficial to avoid devices continually searching for a network when they are potentially low on power in a disaster recovery scenario.

In at least one embodiment, it can be desirable to optimize a cell search list in a disaster recovery scenario. This can be important given the consideration that devices may not have the option of being charged during recovery, such as where there is an accompanying power outage. There can be at least two types of event triggers. For a proactive trigger, the network can be configured and a prioritized access list generated for at least a subset of devices. This might include, for example, stay on the network of CSP A, and if that is not available then go to CSP B, then CSP C, then go to satellite. These options and priority may be listed out for these specific devices.

From a reactive perspective, however, the service can be listening to the event data on the bus and can determine that a cell has gone down. The service then needs to make or suggest changes in near real time. This can involve being able to quickly identify recovery sets look at any given point in time. Proactive versus reactive event triggers can changes the traffic weight as far as the amount of data that is to be pushed to the cloud. As mentioned, the data trickle process can assist with warming this process so the weights can be adjusted from their current settings. From an operator perspective, a CSP might decide that they only want IoT devices to go to the cloud due to the presence of factory automation, for example. The system can keep the common core warm. When an issue is identified based on the events, the system can adjust these weights, say to 90% value, to enable at least some switching of the network to the cloud-based core, or packet core. Such an approach can help to build that neutral host connectivity to some neutral RANs, which may not be the case if it is with the CSP. There thus may be multiple recovery sets built, such as N recovery sets where N is based on severity. If using recovery set 1, the system is not performing any device or network provisioning, but making changes within a CSP network. This may include tasks such as load balancing or cell shaping, for example. If a fiber was cut and a data center is down at a CSP, the service can cause the traffic to be shifted to the common cloud. Such a shift can be performed without modification of any of the device as part of a non-intrusive approach. A second recovery set can relate to actual changes that are to be made to a device. A change may be implemented so that a device can roam between carriers. A third recovery set can involve network augmentation.

Augmentation can be used as well, where connection can be made to a satellite network or other network than a convention terrestrial telecommunication network. The packet core can be a common core that is capable of connecting to different RAN options. The packet core can also be coordinated with the device population, and aggregated per location identified by a key.

Figure 4:
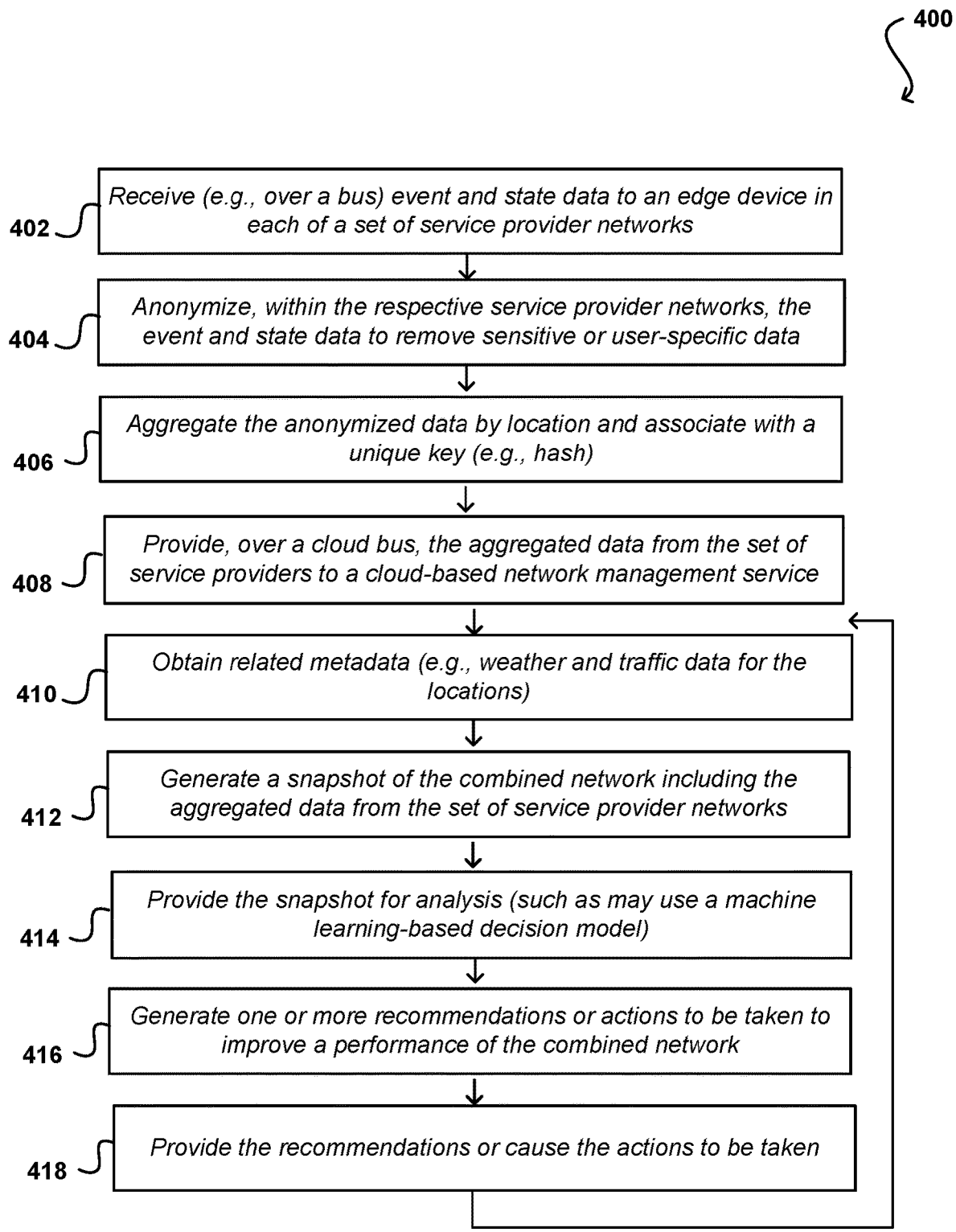
FIG. 4 illustrates an example process for obtaining, aggregating, and acting on information from multiple service providers that can be performed in accordance with various embodiments.

FIG. 4 illustrates an example process 400 for managing communication networks including resources associated with independent providers that can be used in accordance with at least one embodiment. It should be understood that for this and other processes discussed herein that there may be additional, fewer, or alternative steps performed in similar or alternative orders, or at least partially in parallel, within the scope of the various embodiments unless otherwise specifically stated. In this example, event and state data (and other related network data) can be received 402 to an edge device in each of a set of service provider networks. The received data can be anonymized 404 within the respective service provider networks to remove sensitive or user-specific data. The anonymized data can be aggregated 406 by location and associated with a unique key, such as a unique hash key. The aggregated data can be provided 408, over a cloud bus, from the set of service provider networks to a cloud-based network management service. Related metadata can be obtained 410, by the service provider networks or network management service, where that metadata can include data relating to weather, traffic, or other contextual data for the various locations. A snapshot of the state of the combined network can be generated 412 that includes data aggregated from the set of service provider networks. The snapshot can be provided 414 as input to an autonomous, self learning-based decision model (or other appropriate behavioral model or network, etc.). One or more recommendations or (closed loop) actions can be generated 416, which can help to improve operation of the combined network. These recommendations can then be provided 418, or actions caused to be taken, in order to attempt to improve the operation of the combined network. As mentioned, this may involve actions such as rerouting traffic for various locations to different provider networks, among other such options. The recommendations can also vary by location or provider network based upon different behavioral patterns or other such factors.

Figure 5:
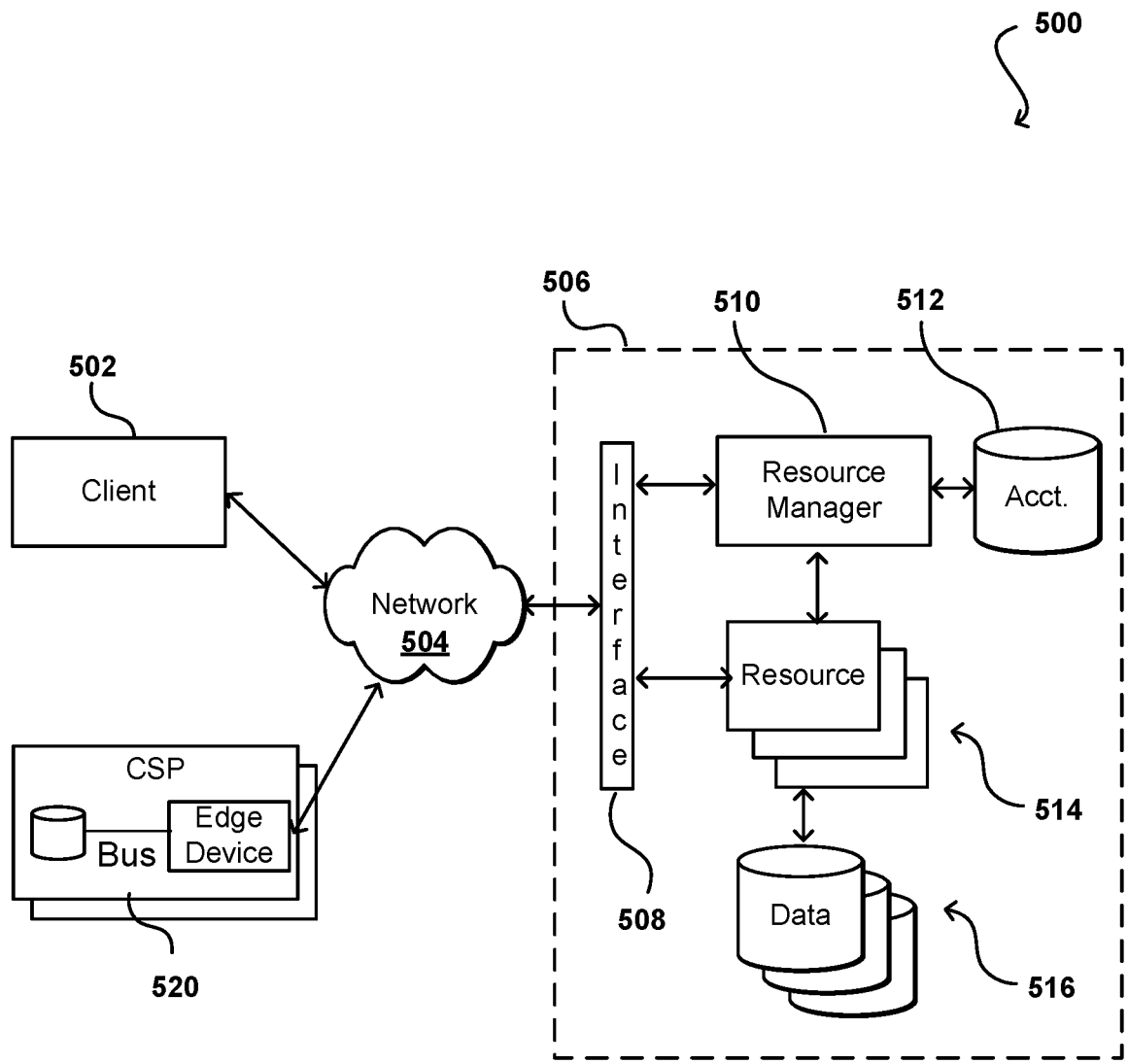
FIG. 5 illustrates an example network-inclusive computing environment in which aspects of various embodiments can be implemented.

FIG. 5 illustrates an example environment 500 in which aspect of various embodiments can be implemented. Such an environment can be used in some embodiments to provide resource capacity for one or more users, or customers of a resource provider, as part of a shared or multi-tenant resource environment. For example, the provider environment 506 can be a cloud environment that can be used to provide cloud-based network connectivity for users, as may be used during disaster recovery or network optimization. The resources may also provide networking functionality for one or more client devices 502, such as smartphones that may be able to connect to one or more network(s) 504, or may be used to perform network optimization tasks as discussed herein. Resources 514 of a provider environment 506 may host network management service functionality, such as may act upon anonymized data received from an edge device in various CSP (or other provider) networks 520, where the CSP-specific data can be received over one or more CSP buses and anonymized by the edge device within a CSP network, before being transmitted to the resourced 514 of the provider environment 506, which may occur over a shared event bridge or bus.

In this example a user is able to utilize a client device 502 to submit requests across at least one network 504 to a multi-tenant resource provider environment 506. This can include an end client that is able to use a certificate for secure communications, where the certificate was obtained using a requestor executing on the end client. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 506 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 502 to communicate with an allocated resource without having to communicate with the resource manager 510, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
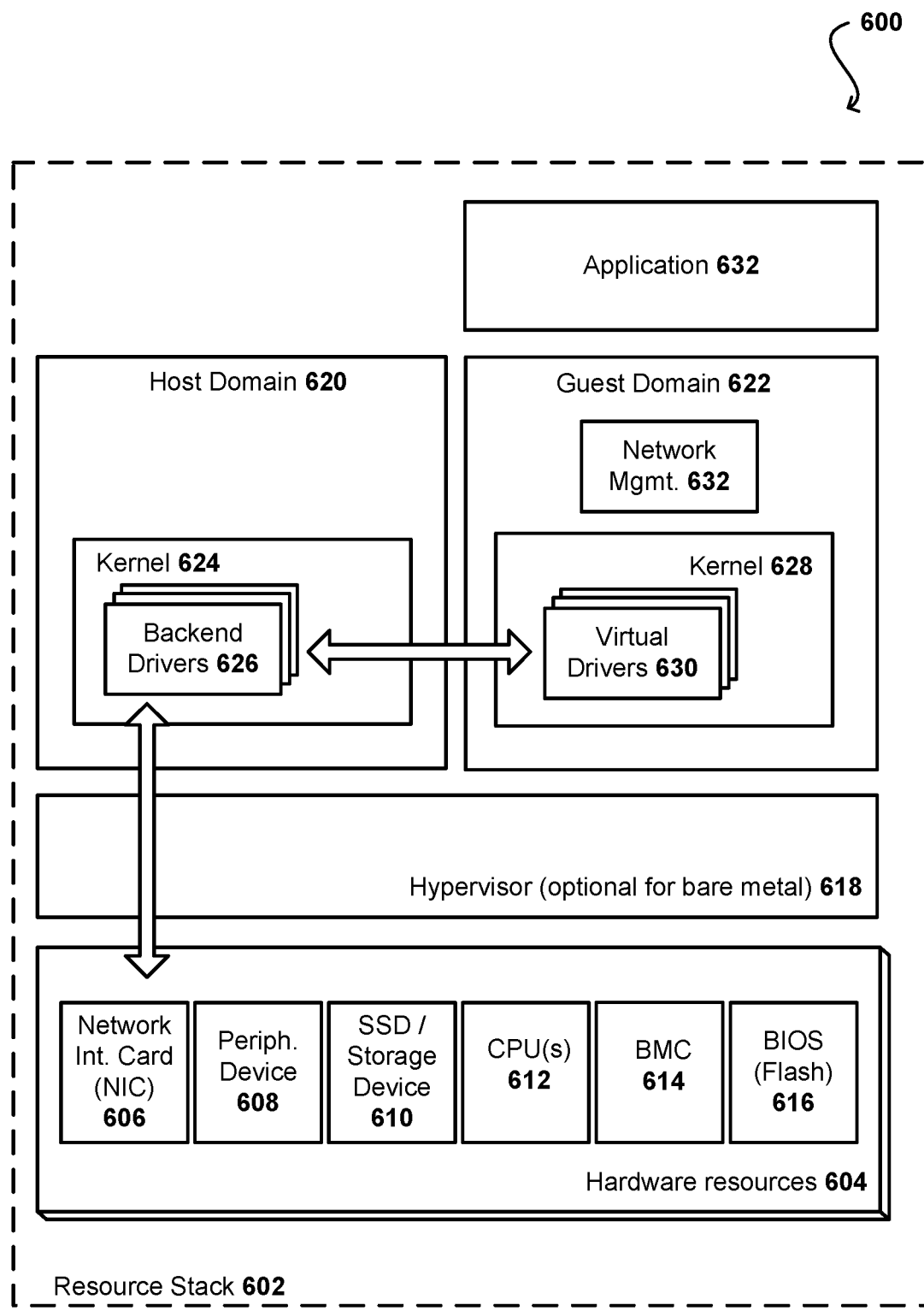
FIG. 6 illustrates example components of a server that can be utilized to perform at least a portion of a network management process, in accordance with various embodiments.

FIG. 6 illustrates an example resource stack 602 of a physical resource 600 that can be utilized in accordance with various embodiments, such as may be provided as part of a provider environment such as that illustrated in FIG. 5. When performing tasks, such as network optimization or re-routing using a network management module 632, for example, such resources can include components such as CPUs 612 for executing code to perform these tasks, NICs 606 for communicating network traffic, and memory for storing instructions and networking data. In some embodiments, an entire machine may be allocated for these tasks, or only a portion of the machine, such as to allocate a portion of the resources as a virtual machine in a guest domain 622 that can perform at least some of these tasks.

Such a resource stack 602 can be used to provide an allocated environment for a user (or customer of a resource provider) having an operating system provisioned on the resource. In accordance with the illustrated embodiment, the resource stack 602 includes a number of hardware resources 604, such as one or more central processing units (CPUs) 612; solid state drives (SSDs) or other storage devices 610; a network interface card (NIC) 606, one or more peripheral devices (e.g., a graphics processing unit (GPU), etc.) 608, a BIOS implemented in flash memory 616, and a baseboard management controller (BMC) 614, and the like. In some embodiments, the hardware resources 604 reside on a single computing device (e.g. chassis). In other embodiments, the hardware resources can reside on multiple devices, racks, chassis, and the like. Running on top of the hardware resources 604, a virtual resource stack may include a virtualization layer such as a hypervisor 618 for a Xen-based implementation, a host domain 620, and potentially also one or more guest domains 622 capable of executing at least one application 632. The hypervisor 618, if utilized for a virtualized environment, can manage execution of the one or more guest operating systems and allow multiple instances of different operating systems to share the underlying hardware resources 604. Conventionally, hypervisors are installed on server hardware, with the function of running guest operating systems, where the guest operating systems themselves act as servers.

In accordance with an embodiment, a hypervisor 618 can host a number of domains (e.g., virtual machines), such as the host domain 620 and one or more guest domains 622. In one embodiment, the host domain 620 (e.g., the Dom-0) is the first domain created and helps virtualize hardware resources and manage all of the other domains running on the hypervisor 618. For example, the host domain 620 can manage the creating, destroying, migrating, saving, or restoring the one or more guest domains 622 (e.g., the Dom-U). In accordance with various embodiments, the hypervisor 618 can control access to the hardware resources such as the CPU, input/output (I/O) memory, and hypervisor memory.

A guest domain 622 can include one or more virtualized or para-virtualized drivers 630 and the host domain can include one or more backend device drivers 626. When the operating system (OS) kernel 628 in the guest domain 622 wants to invoke an I/O operation, the virtualized driver 630 may perform the operation by way of communicating with the backend device driver 626 in the host domain 620. When the guest driver 630 wants to initiate an I/O operation (e.g., to send out a network packet), a guest kernel component can identify which physical memory buffer contains the packet (or other data) and the guest driver 630 can either copy the memory buffer to a temporary storage location in the kernel for performing I/O or obtain a set of pointers to the memory pages that contain the packet(s). In at least one embodiment, these locations or pointers are provided to the backend driver 626 of the host kernel 624 which can obtain access to the data and communicate it directly to the hardware device, such as the NIC 606 for sending the packet over the network.

It should be noted that the resource stack 602 illustrated in FIG. 6 is only one possible example of a set of resources that is capable of providing a virtualized computing environment and that the various embodiments described herein are not necessarily limited to this particular resource stack. In some embodiments, the guest domain 622 may have substantially native or "bare metal" access to the NIC 606 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 614 can maintain a list of events that have occurred in the system, referred to herein as a system event log (SEL). In at least one embodiment, the BMC 614 can receive system event logs from the BIOS 616 on the host processor. The BIOS 616 can provide data for system events over an appropriate interface, such as an I²C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 618 can prevent the guest operating system, or guest domain 622, from sending such system event log data to the BMC 614. In the case of bare metal access without such a hypervisor, however, user instances can have the ability to send data for system event that spoof events from the BIOS 616. Such activity could lead to compromised bare metal instances being prematurely degraded due to fake system event data produced by the user OS.

In at least one embodiment, however, there will be portions of the physical resource 600 that will be inaccessible to the user OS. This can include, for example, at least a portion of BIOS memory 616. BIOS memory 616 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 616 at boot time, before a user OS is executing on the resource. Once the user OS is executing on the resource, that OS will be prevented from accessing that secret token in BIOS memory 616. In at least one embodiment, this secret token (or other stored secret) can be provided to the BMC 614 when adding system event log events, whereby the BMC 614 can confirm that the event is being sent by the BIOS 616 and not by the user OS.

Figure 7:
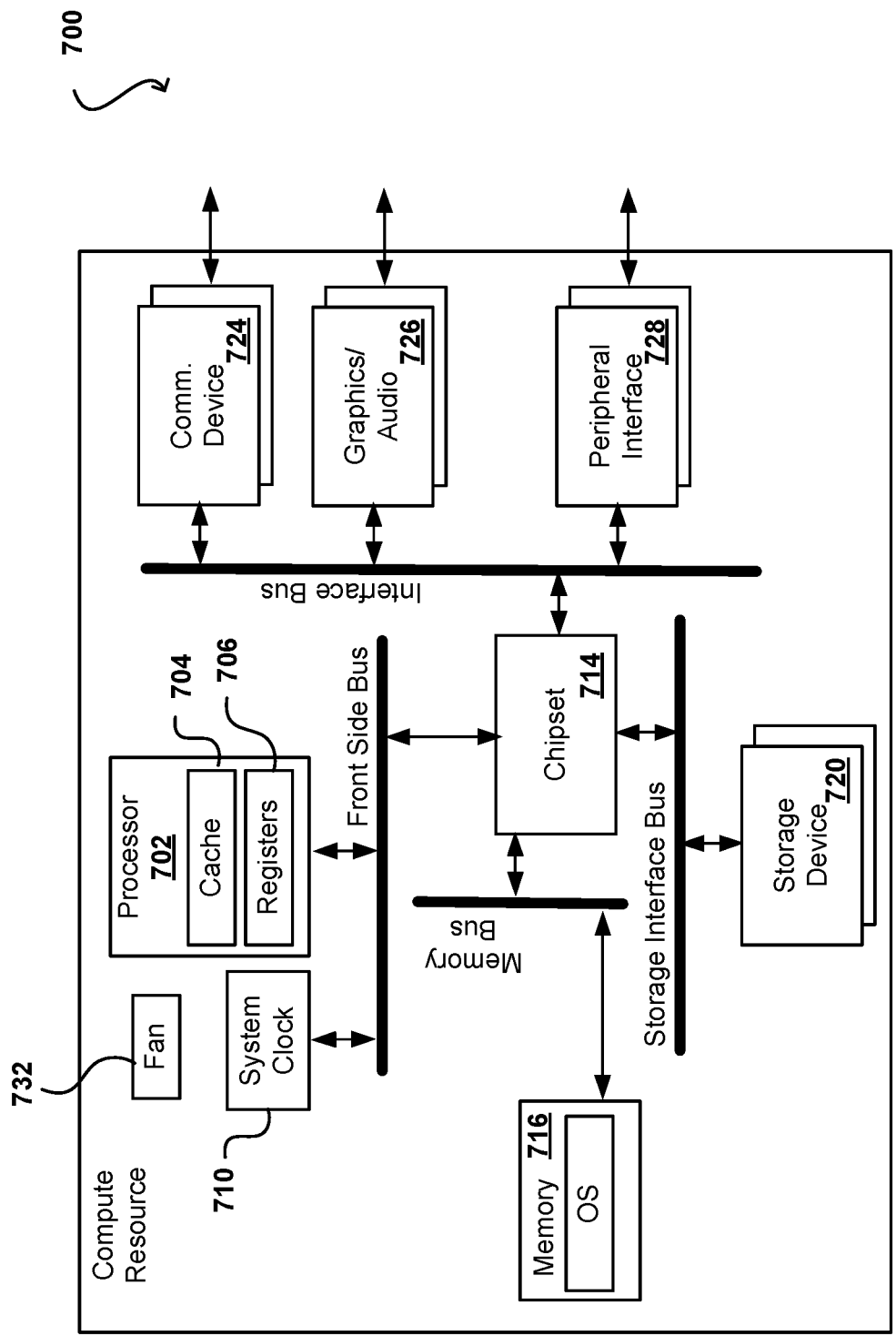
FIG. 7 illustrates example components of a computing device that can be used to implement network monitoring and management aspects of various embodiments.

Computing resources, such as servers, smartphones, or personal computers, will generally include at least a set of standard components configured for general purpose operation, although various proprietary components and configurations can be used as well within the scope of the various embodiments. As mentioned, this may include client devices for transmitting and receiving network communications, or servers for performing tasks such as network analysis and rerouting, among other such options. FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 728 for connecting peripheral devices, such as printers, keyboards, and the like. At least one cooling fan 732 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 728, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
obtaining, using edge devices in a plurality of separate telecommunication service provider networks, provider network-specific data regarding operation of network resources associated with the separate telecommunication service provider networks;
anonymizing, at the edge devices, the provider network-specific data to generate operation data associated with specific locations and a plurality of keys indicating one or more aspects of the operation data;
transmitting, using a shared event bus, the operation data from the edge devices in the plurality of separate telecommunication service provider networks to a network management service;
analyzing the operation data, aggregated from the edge devices, to determine at least a current state or a predicted future state of the plurality of separate telecommunication service provider networks, individually and as part of a combined telecommunication network;

generating, by the network management service, one or more recommendations to improve a current operation or a future operation of at least one of the plurality of separate telecommunication service provider networks, individually or as part of the combined telecommunication network; and providing the one or more recommendations with respect to the plurality of separate telecommunication service provider networks.

2. The computer-implemented method of claim 1, further comprising:

obtaining the provider network-specific data by causing the edge devices in the plurality of separate telecommunication service provider networks to listen to one or more event buses or subscribe to receive data for certain types of events in the separate telecommunication service provider networks.

3. The computer-implemented method of claim 1, wherein the one or more recommendations include one or more actions recommended to be taken, and further comprising automatically causing at least one of the actions to be taken in, or with respect to, at least one of the separate telecommunication service provider networks.

4. The computer-implemented method of claim 1, further comprising:

obtaining additional metadata including at least one of weather, congestion maps, or traffic maps; and generating the one or more recommendations based further in part upon the additional metadata.

5. The computer-implemented method of claim 1, wherein the one or more recommendations relate to an ability of individual devices, connected to one or more of the separate telecommunication service provider networks in one or more locations of the specific locations, or associated with one or more of the plurality of keys, to attempt to connect to one or more other communication networks according to a determined priority list, the one or more other communication networks including at least one of a different telecommunication service provider network, a cloud-based network, or a satellite network.

6. A computer-implemented method, comprising:

receiving, over a shared channel and from listening resources within a plurality of separate communication networks, current operation data for network resources associated with the plurality of separate communication networks, the listening resources to anonymize the current operation data to associate instances of the current operation data with a location and a group key;

analyzing the anonymized data, aggregated from the plurality of listening resources for the plurality of separate communication networks, using a self learning-based decision model; and generating one or more recommendations to be taken to improve operation of at least one of the plurality of separate communication networks, individually or as part of an overall network.

7. The computer-implemented method of claim 6, further comprising:

aggregating the anonymized data with at least current contextual metadata or future contextual data determined to be relevant to the operation of the overall network.

8. The computer-implemented method of claim 6, further comprising:

generating one or more network snapshots representing a current state of the overall network, including the resources of the plurality of separate communication networks, using the aggregated, anonymized data.

9. The computer-implemented method of claim 6, wherein the current operation data is received over a plurality of event buses to edge devices in the plurality of separate communication networks, and wherein the shared channel is a shared event bus between the plurality of separate communication networks and a network management service.

10. The computer-implemented method of claim 9, wherein the one or more recommendations include at least one action able to be automatically taken by one of the edge devices, as instructed by a network management service, on behalf of at least one of the plurality of separate communication networks.

11. The computer-implemented method of claim 6, wherein the one or more recommendations relate to rerouting at least a portion of network traffic for a location to at least one of a different provider network, a cloud-based network, a cell on wheels network, a newly-instantiated network, a satellite-based network, a drone-based network, a private network, or a balloon-based network.

12. The computer-implemented method of claim 6, wherein the one or more recommendations relate to one or more individual users, devices, locations, or service providers.

13. The computer-implemented method of claim 6, wherein the self learning-based decision model is a machine learning model that is trained to infer the one or more recommendations to be taken to improve operation at a current time or at least one future time based on one or more learned behavioral patterns.

14. The computer-implemented method of claim 13, wherein the self learning-based decision model is further trained using reinforcement learning with feedback associated with one or more prior recommendations.

15. A system, comprising:

a processor; and memory including instructions that, when executed by the processor, cause the system to:

obtain, over a shared event bus, anonymized data from a plurality of communication networks, the anonymized data relating to at least a current operation of network resources operated in the plurality of communication networks and being generated by a plurality of edge devices listening on internal buses of the plurality of communication networks, wherein the anonymized data is grouped by at least location information associated with the current operation;

analyze the anonymized data, generated from the plurality of edge devices, to generate one or more recommendations to improve operation of at least one of the plurality of communication networks, individually or as part of a combined network; and provide the one or more recommendations to an edge device of the plurality of edge devices, the edge device associated with at least one communication network of the plurality of communication networks.

16. The system of claim 15, wherein the instructions when executed further cause the system to:

aggregate the anonymized data with contextual metadata associated with operation of the combined network.

17. The system of claim 15, wherein the instructions when executed further cause the system to:

generate one or more network snapshots representing at least a current state of the combined network, including the network resources of the plurality of communication networks, using the anonymized data.

18. The system of claim 15, wherein the plurality of edge devices receives provider-specific operation data and generate the anonymized data, wherein individual locations included in the location information are associated with a corresponding unique identifying key.

19. The system of claim 15, wherein the one or more recommendations relate to rerouting at least a portion of network traffic for a location to at least one of a different provider network, a cloud-based network, a cell on wheels network, a newly-instantiated network, a satellite-based network, a drone-based network, a private network, or a balloon-based network.

20. The system of claim 15, wherein the one or more recommendations are generated using a self learning-based decision model operated using a cloud-based service, and wherein the anonymized data is received over a common cloud bus.

* * * * *